(12) United States Patent
Hausmann (10) Patent No.: US 10,890,260 B2
(45) Date of Patent: Jan. 12, 2021

(54) TANK VALVE (71) Applicant: Daimler AG, Stuttgart (DE)

(72) Inventor: Philipp Hausmann, Kirchheim (DE)

(73) Assignee: Daimler AG, Stuttgart (DE)

( * ) Notice: Subject to any disclaimer, the term of this patent is extended or adjusted under 35 U.S.C. 154(b) by 129 days.

(21) Appl. No.: 16/314,049

(22) PCT Filed: Jun. 28, 2017

(86) PCT No.: PCT/EP2017/000764
§ 371 (c)(1),
(2) Date: Dec. 28, 2018

(87) PCT Pub. No.: WO2018/001560
PCT Pub. Date: Jan. 4, 2018

(65) Prior Publication Data
US 2019/0170260 A1 Jun. 6, 2019

(51) Int. Cl.
*F16K 1/30* (2006.01)
*F17C 13/04* (2006.01)

(52) U.S. Cl.
CPC .............. *F16K 1/303* (2013.01); *F17C 13/04* (2013.01); *F17C 2201/0109* (2013.01); *F17C 2201/056* (2013.01); *F17C 2201/058* (2013.01); *F17C 2205/0134* (2013.01); *F17C 2205/035* (2013.01); *F17C 2205/0317* (2013.01); *F17C 2205/0326* (2013.01); *F17C 2205/0329* (2013.01); *F17C 2205/0332* (2013.01); *F17C 2205/0335* (2013.01); *F17C 2205/0341* (2013.01); *F17C 2205/0385* (2013.01); *F17C 2205/0391* (2013.01); *F17C 2205/0394* (2013.01); *F17C 2221/012* (2013.01);

(Continued)

(58) Field of Classification Search
CPC .................................. F16K 1/303; F17C 13/04
USPC ............................................................ 137/590
See application file for complete search history.

(56) References Cited

U.S. PATENT DOCUMENTS

| 5,458,151 A | 10/1995 | Wass |
| 5,941,268 A | 8/1999 | Ross, Jr. |

(Continued)

FOREIGN PATENT DOCUMENTS

| CN | 202972091 U | 6/2013 |
| DE | 43 34 182 A1 | 4/1995 |

(Continued)

OTHER PUBLICATIONS

German Search Report issued in German counterpart application No. 10 2016 008 107.4 dated May 15, 2019, with Statement of Relevancy (Nine (9) pages).

(Continued)

*Primary Examiner* — Kevin L Lee
(74) *Attorney, Agent, or Firm* — Crowell & Moring LLP (57) ABSTRACT

A tank valve for installation at a pressure gas tank has a base body including a first base body section, which in the assembled state projects into the pressure gas tank and is sealingly connected with the same, and includes a second base body section, which in the assembled state remains outside the pressure gas tank. The tank valve further has a plurality of functional sub-groups for refueling the pressure gas tank via a refueling path, for the extraction of gas from the pressure gas tank via an extraction path, and for implementing safety and operating functions.

9 Claims, 4 Drawing Sheets

(52) U.S. Cl.
CPC .............. *F17C 2221/033* (2013.01); *F17C 2223/0123* (2013.01); *F17C 2223/036* (2013.01); *F17C 2225/045* (2013.01); *F17C 2250/0439* (2013.01); *F17C 2260/012* (2013.01); *F17C 2260/018* (2013.01); *F17C 2260/042* (2013.01); *F17C 2265/066* (2013.01); *F17C 2270/0178* (2013.01); *F17C 2270/0184* (2013.01); *Y02E 60/32* (2013.01)

(56) References Cited

U.S. PATENT DOCUMENTS

| | | | |
|---|---|---|---|
| 5,992,219 A * | 11/1999 | Otaka | B60K 15/013 73/40.5 R |
| 6,834,674 B2 | 12/2004 | Koschany et al. | |
| 6,911,065 B2 | 6/2005 | Watanabe et al. | |
| 7,152,617 B1 | 12/2006 | Crawford | |
| 7,722,009 B2 | 5/2010 | Perthel et al. | |
| 8,573,253 B2 * | 11/2013 | Ogami et al. | F17C 13/04 137/590 |
| 9,644,793 B2 | 5/2017 | Lee | |
| 2007/0240770 A1 | 10/2007 | Yamashita et al. | |
| 2008/0289700 A1 | 11/2008 | Masingale | |
| 2009/0146094 A1 | 6/2009 | Suzuki et al. | |
| 2009/0288723 A1 | 11/2009 | Numazaki et al. | |
| 2014/0239207 A1 | 8/2014 | Ninomiya et al. | |

FOREIGN PATENT DOCUMENTS

| | | |
|---|---|---|
| DE | 100 65 268 C1 | 8/2002 |
| DE | 698 18 366 T2 | 6/2004 |
| DE | 103 61 781 A1 | 6/2005 |
| DE | 10 2009 046 004 A1 | 4/2011 |
| DE | 10 2013 015 515 A1 | 3/2015 |
| DE | 10 2013 019 879 A1 | 5/2015 |
| EP | 1 682 801 B1 | 7/2006 |
| EP | 1 801 487 A1 | 6/2007 |
| JP | 11-36989 A | 2/1999 |
| JP | 2009-168165 A | 7/2009 |
| JP | 2009-197249 A | 9/2009 |
| WO | WO 2006/022393 A1 | 3/2006 |

OTHER PUBLICATIONS

English translation of previously cited reference B7 (Nine (9) pages), at least by Jul. 2016.
Japanese Office Action issued in Japanese application No. 2018-567720 dated Jan. 28, 2020, with English translation (Ten (10) pages).
PCT/EP2017/000764, International Search Report dated Oct. 17, 2017 (Three (3) pages).
Chinese Office Action issued in Chinese application No. 201780040735.9 dated Mar. 30, 2020, with partial English translation (Eleven (11) pages).

* cited by examiner

TANK VALVE

BACKGROUND AND SUMMARY OF THE INVENTION

The present invention relates to a tank valve. Moreover, the present invention relates to the use of such a tank valve.

A tank valve for installation at a pressure gas tank is generally known from the prior art. Such a tank valve is also often referred to by the English term on tank valve or its abbreviation OTV. The tank valve is a structure including a base body, having at least two sections, a first base body section in the assembled state projecting into the pressure gas tank and being sealingly connected thereto. Typically, this first base body section is screwed via an external thread into an internal thread of a corresponding receptacle of the pressure gas tank. In addition to this first base body in the assembled state positioned within the pressure gas tank or its connection thread, the base body typically has a second base body section, which in the assembled state is located outside of the pressure gas tank. One or typically both of the base body sections have so-called functional sub-groups, which are necessary for realizing the functionality of the tank valve. Such functional sub-groups may be, for example, an extraction valve, a check valve in a refueling line, a safety valve, a (manual) shut-off valve, a filter, a connection socket for a fueling and/or extraction line or the like.

As an example for such a tank valve, JP 2009-168165 A shall be noted, which shows such a tank valve under the designation of high-pressure valve. Additional such valves, for example, are known from US 2009/0146094 A1 or, in the embodiment as a pilot valve, which is also known from EP 1 682 801 B1.

Pressure gas tanks having such tank valves are frequently used in motor vehicles for the storage of gaseous fuels, such as natural gas or hydrogen. In automotive applications, the safety and crash protection always play a crucial role in this instance. In conventionally constructed tank valves, a plurality of functional sub-groups is located in the second base body section positioned outside of the pressure gas tank, in particular, because the installation volume for the first base body section is typically limited by the diameter of the thread of the pressure gas tank. In the event of an accident involving the vehicle or another type of impairment of the gas cylinder in an accident, which can in principle also occur outside of a vehicle, safety-critical situations may thus result, in which the pressure gas tank may be emptied uncontrollably, or in which, owing to sheared safety valves or the like, the pressure gas tank can no longer empty itself. If extreme temperatures develop in such a situation, for example due to a fire, then the pressure gas tank equipped with the damaged tank valve can explode.

The object of the present invention is now to prevent the mentioned disadvantage and to indicate a secure construction of a tank valve.

Similar to the tank valves according to the prior art, the tank valve according to the present invention has a base body, in which a plurality of functional sub-groups is integrated for the refueling of the pressure gas storage tank, for removal of gas from the pressure gas storage tank and for the implementation of security functions. For this purpose, a first base body section projecting into the interior of the pressure gas tank and in the assembled state is, in particular via a thread, connected to a corresponding receptacle in the pressure gas tank. According to the present invention, it is now such that individual functional sub-groups are situated in or at the first base body section. In this instance, the functional sub-groups are in particular security-relevant functional sub-groups. Owing to their positioning in the first base body section or to being installed at the first base body section in the direction of the interior of the pressure gas tank, the functional sub-groups in the case of damage to the pressure gas tank are comparatively secure having the screwed-on tank valve. This is in particular advantageous if the pressure gas tank having the screwed-on tank valve is, for example, used in a vehicle and is negatively impacted in an accident. In this instance, the pressure gas tank itself is typically very stable, in particular the receiving device, to which the tank valve is connected, in most cases screw-connected. The first base body section, which is located within the pressure gas tank and to a large extent of its expansion within the receiving device of the pressure gas tank for the tank valve, is correspondingly well protected so that, even in the event of damage to the tank valve and, for example, a shearing of the second base body section of the tank valve from the first base body section, the functional sub-groups disposed in the first base body section remain undamaged. This good protection is, in particular in automotive applications, a decisive advantage for security.

In principle, a plurality of functional sub-groups can be disposed in the first base body section. On account of the typically constricted space in the interior of the receiving device and the necessary material of the first base body section to ensure a sufficient stability of the tank valve, the available installation space in the first base body section is limited. For this reason, in particular the security-relevant functional sub-groups can be disposed in this area of the first base body section.

According to an advantageous further refinement of the idea, it is therefore provided that in the first base body section at least one nonreturn valve is provided in the refueling path or in a refueling line forming the refueling path within the base body. Such a nonreturn valve in a refueling line ensures that the refueling line, when not used, is closed by the gas pressurized in the pressure gas storage tank. For this purpose, typically a nonreturn valve having an additional spring support against the direction of flow is provided during refueling. This security-relevant component can now be disposed in the first base body section so that it is safely accommodated.

According to a further very advantageous embodiment of the idea, it now can further be provided that the functional sub-groups in the first base body section include a pipe burst protection in the extraction path. Such a pipe burst protection ensures that, in the event of a burst or a failure of the pipe, the pipe will be closed. The pipe may in particular be made of a valve device, which as a function of a differential pressure between the side facing the interior of the pressure gas tank and the other side facing the downstream side of an extraction line. If on the side of the extraction path no pressure is present or if the pressure rapidly decreases, for example because the pipe or a valve disposed in the pipe is damaged or sheared off, then the pipe burst protection closes the pipe by a valve body, and thus prevents the outflow of gas from the pressure gas tank. These safety-relevant components also can now be disposed, in particular, in the interior of the pressure gas tank, and, for this reason, can be disposed on or in the first base body section of the tank valve.

According to a further very advantageous embodiment of the idea, it can be furthermore provided that the functional sub-groups in the first base body section include a rigid cover in a line segment leading to or from a safety valve. Typically, tank valves have safety valves, for example thermally actuated safety valves. Via these safety valves, for the case that these safety valves respond, gas is discharged from the interior of the pressure gas tank to prevent an extreme overpressure and the risk of an explosion of the pressure gas tank. For example, this can be the case when a fire occurs. In order to prevent an uncontrolled outflow also in the case that the tank valve itself is damaged and for example the safety valve, which can be disposed in the second base body section, is separated from the first base body section, according to this advantageous further refinement of the idea, a rigid cover can be provided in the first base body section. By design, the volume of the outflowing gases is limited via this rigid cover so that the gas outflows from the interior of the pressure gas tank by a comparatively controlled volumetric flow and so that the gas does not uncontrollably escape into the surroundings.

In a further very advantageous variation of the tank valve according to the present invention, it may now be provided that a safety valve, in particular a thermally actuated safety valve, as described in the previous paragraph, is integrated in the first base body section or it is installed at the first base body section in the direction of the tank interior. The safety valve important with regard to safety, in particular the thermally actuated safety valve, provides a further advantage with regard to safety in the case of damage to the tank valve, for example by shearing of the second base body section, which in the assembled state of the tank valve is located outside of the pressure gas storage tank. Since the base body according to an ideal embodiment is configured from a highly heat conductive metallic material, for example aluminum, in the case of increased temperature, for example owing to a fire, the heat is reliably conducted via the base body into the area of the thermally actuated safety valve so that its integration into first base body section results into advantages with regard to safety and does not have disadvantages with regard to triggering.

According to a further very advantageous idea of the present invention, it may now be provided that further functional sub-groups are disposed in the second base body section. For this purpose, it may be provided that all functional sub-groups located in the second base body section, thus the section of the base body in the assembled state located outside of the pressure gas tank, are disposed in one plane. In this instance, this positioning in one plane refers to the primary axial alignment and the direction of actuation of the individual functional sub-groups. In particular, the functional sub-groups can be configured in such a way so that they can be screw-connected to the base body. The central axes of the bores in the base body having the threads for accommodating such functional subgroups are disposed in the tank valve according to the present invention in a single plane of the base body. The integration of all functional sub-groups in the second base body section within a single plane enables a very compact construction of the second base body section. For example, the second base body section can, when used in a pressure gas tank for storing hydrogen at a nominal pressure of 70 MPa, be configured in such a way that it has a thickness of only about 25 to 35 mm. As a result, an extraordinarily compact construction of the tank valve according to the present invention is possible.

According to a very advantageous further refinement of the idea, the plane in this instance is disposed in a perpendicular manner to a central axis of the first base body section and, in particular, to a central axis of the pressure gas tank. Typically, the first base body section has a central axis, which typically coincides with the central axis of the pressure gas tank because the first base body section is typically screw-connected to a central intake of the pressure gas tank. The plane having the functional sub-groups of the second base body section, is situated in a perpendicular manner to this central axis, thus to the rotary axis of the tank valve, when it is screw-connected to the pressure gas tank. As a result, an extraordinarily compact construction is possible, in which the axial length of the pressure gas tank having the installed tank valve is extraordinarily small. In particular when used for the storage of fuel in a vehicle, this is a significant advantage because the available installation space can be used in such a way that the maximum storage volume of the pressure gas tank can be realized. In so doing, a corresponding high operating distance of the vehicle can be achieved. In particular, the operating distance can, vis-à-vis the use of conventional tank valves for an unaltered installation space available in the vehicle, be increased by increasing the volume of the pressure gas tank.

According to a very advantageous further refinement of the idea, the functional sub-groups in this instance are situated in parallel and/or arranged in a star formation in the second base body section. Within the plane, the functional sub-groups are thus situated in parallel and/or in a star formation in the second base body section. This enables, also with regard to the available installation space in the radial direction in relation to a central axis of the plane, a very compact system. This reduces the required installation space also in this direction and serves in particular also weight savings since the base body can be realized in a correspondingly compact manner and with less material. Furthermore, this positioning serves a very simple and efficient drilling of the intakes for the functional sub-groups and for the channels necessary in the second base body section.

As already mentioned, the functional sub-groups can be configured to be screw-connected to the base body, as it is also provided according to an advantageous further refinement of the tank valve according to the present invention.

A further very advantageous embodiment of the valve tank according to the present invention furthermore provides that the base body is made of an aluminum alloy. According to an advantageous further refinement, the base body in particular can be forged. Such fabrication of the base body made of an aluminum alloy, in particular as a forged component, is simple, inexpensive and allows the production of a high strength and yet lightweight component. The functional subgroups made from a stainless steel material then can typically be screw-connected.

According to a further very advantageous embodiment of the tank valve according to the present invention, for this purpose, at least some of the following functional sub-groups can be integrated in the second base body section:
  extraction valve, in particular in the form of a pilot valve, which preferably is electromagnetically actuatable;
  a safety valve, in particular a thermally actuated safety valve, provided that this safety valve is not already disposed or installed at the first base body section;
  a shut-off valve, preferably a manually actuatable shut-off valve;
  a drain valve, in particular a manually actuatable drain valve;
  a filter, in particular an inlet filter;
  a gas connection for refueling with gas and/or extracting gas;
  a discharge connection, which in particular is connectable to a line segment, which serves the discharge of gas escaping via the safety valve and/or the drain valve.

Further functional sub-groups known per se, which in principle are known to those skilled in the art, can also be configured in an integrated manner in the second base body section.

As already mentioned multiple times, the decisive advantage of the tank valve is its very high safety, also for the case that the tank valve is damaged, for example, as result of an accident. This advantage is correspondingly advantageous in particular in automotive applications. For this reason, a use of the tank valve at a pressure gas tank for the storage of hydrogen or natural gas as a fuel, and here in particular for a nominal pressure of more than 65 MPa, is provided in a vehicle.

Further advantageous embodiments of the tank valve according to the present invention and its use moreover result from the exemplary embodiments, which subsequently are described in greater detail in reference to the figures.

DETAILED DESCRIPTION OF THE DRAWINGS

Figure 1:
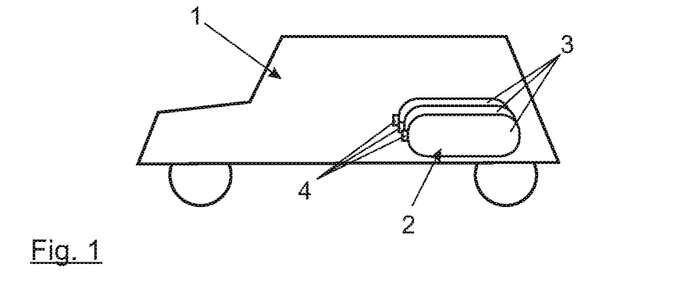
FIG. 1 shows a principle illustration of a vehicle having a storage system for compressed gas as a fuel.

In the illustration in FIG. 1, a vehicle 1 is indicated simply as a matter of example. The vehicle is to be actuated by a gaseous fuel, for example by compressed natural gas or compressed hydrogen. For this purpose, the fuel can be converted into power used for actuation in an internal combustion engine or, in particular when using hydrogen, preferably also in a fuel cell system. For storing the compressed gas, a storage device, in its entirety referenced with reference character 2, is provided in vehicle 1. This storage device is made up of a plurality of individual pressure gas tanks 3, each of which carries a tank valve 4. This tank valve 4 is also referred to as on tank valve or abbreviated as OTV. In this instance, individual pressure gas tanks 3 together with their tank valves 4 can be connected to one another via a common pipe, for example such as it is known from the prior art mentioned at the outset, so that gas from storage device 2 can be used in the vehicle. In particular when storing hydrogen, for example for the preferred application in a fuel cell system, in this instance, the nominal pressure for such pressure gas tanks 3 having their tank valves 4 is typically in the order of 70 MPa. In addition to the safety requirements with regard to individual pressure gas tanks 3 as well as their tank valves 4, moreover high demands with regard to tightness but also with regard to the potential of producing the same in a secure, reliable and cost-effective manner, have to be made.

Figure 2:
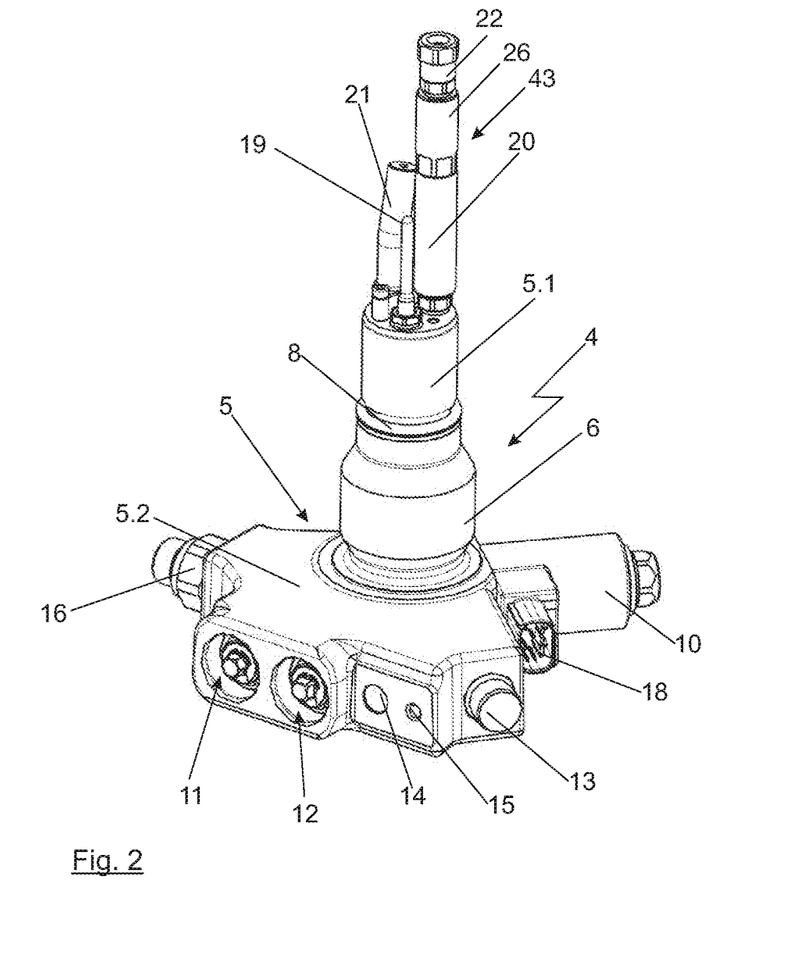
FIG. 2 shows a three-dimensional illustration of a possible embodiment of a tank valve according to the present invention.

In the illustration in FIG. 2, a three-dimensional illustration of a tank valve 4 can be seen. For this purpose, tank valve 4 includes a base body 5, which substantially is made up of two sections. A first base body section 5.1 is formed in such a manner that it, in the subsequent assembled state of tank valve 4, projects into respective pressure gas tank 3. For this purpose, the first base body section in the exemplary embodiment shown here has a thread denoted by reference character 6, which correspondingly acts together with a respective thread in a receiving element 7 of pressure gas tank 3, which is partially indicated in the illustration of FIG. 3. Moreover, this first base body section 5.1 has a sealing device indicated in the illustration of FIG. 2, for example made from one or a plurality of sealing rings and/or support rings. A second base body section 5.2 can be seen, in the illustration of FIG. 2, in the lower region of tank valve 4. This second base body section 5.2 after the installation of tank valve 4 is located outside of pressure gas tank 3, as for example indicated in FIG. 3 in a schematic side view. For this purpose, second base body section 5.2 has a plurality of so-called functional sub-groups of tank valve 4. The functional sub-groups in second base body section 5.2 in this instance include an electromagnetically actuated pilot valve 9 as an extraction valve for extracting gas from pressure gas tank 3. The pilot valve is actuated by an electromagnetic coil denoted by 10, and in the illustration in FIGS. 2 and 3 only electromagnetic coil can be seen. In the illustration in FIG. 4, pilot valve 9 itself is schematically indicated. With regard to the functionality of such a pilot valve, the embodiments in DE 10 2013 019 879 A1 of the applicant can be highlighted as an example.

In the illustration of FIG. 2, further functional sub-groups, integrated in second base body section 5.2 or installed at the second base body section in the direction of the interior of pressure gas tank 3, can be seen. For example, these functional subgroups are two manual valves 11, 12 situated in parallel to each other, manual valve 11 being formed as manual shut-off valve 11 and manual valve 12 configured as manual drain valve 12. Manual shut-off valve 11 and manual drain valve 12 are also again indicated in the illustration of FIG. 4. The valves can be constructed in such a way that they are identically realized in their construction. The installation is carried out as such that manual shut-off valve 11 in the installed state and in the normal state is open and that manual drain valve 12 in the installed state and in the normal state is correspondingly closed. Details of the functionality are discussed in greater detail within eh framework of the description of the illustration in FIG. 4.

Moreover, as a further functional sub-group in second base body section 5.2, the part of a thermally actuated safety valve 13 can now be seen. Such thermally actuated safety valves in principle are known from the general prior art. In a conventional embodiment, here a screw is inserted having a central boring. A solder or a retaining element held above a solder is located in the central bore. If the area of tank valve 4 or thermally actuated safety valve 13 is heated above the melting temperature of the solder, the through hole in the screw is released and the gas in the interior of pressure gas tank 13, which is in permanent connection with the screw, can outflow. An alternative, which in particular is very frequently used in the European and the American market, is a construction, in which a valve body is held in position by a glass ampoule having a boiling liquid. The boiling point of the liquid in the glass ampoule is coordinated in such a way that the liquid at a critical temperature of thermally actuated safety valve 13 starts to boil. Owing to an increase in volume when boiling, the glass ampoule is destroyed and releases the valve body vis-à-vis the valve seat. The pressure of the gas in the pressure gas tank, which rests at the valve body, the pressure is moved into an open position away from the valve seat so that the gas can outflow from pressure gas tank 3. In the illustration on FIGS. 2 and 4, a discharge connection denoted by reference character 14, which upon a response of thermally actuated safety valve 13 is connected to the interior of pressure gas tank 3, serves this purpose. Next to discharge connection 14 or its opening in second base body section 5.2 of tank valve 4, a threaded hole in the figures denoted by reference character 15, which is suited for accommodating a screw. Here, a so-called discharge connection or venting tube can simply and reliably be screwed on, for example in such a manner as described in the German patent publication DE 10 2013 015 515 A1 of the applicant.

As a further functional sub-group, a gas connection 16 in the region of second base body section 5.2 can be seen in the illustration of FIG. 2. This gas connection, for example, can be used for extracting gas from the pressure gas tank via pilot valve 9 and/or for refueling pressure gas tank 3. In the illustration in FIG. 4, it moreover can be seen that, integrated in gas connection 16, a filter denoted by reference character 17 is disposed, which, in particular when using gas connection 16 for refueling pressure gas tank 3, filters out contaminations in the gas flowing in pressure gas tank 3.

A further element in the area of second base body section 5.2 or in the region of electromagnetic coil 10 visible in the illustration of FIG. 2, in this instance, is a plug connector denoted by reference character 18, via which, on the one hand, electromagnetic coil 10 and, for this reason, pilot valve 9, and on the other hand, measuring data, for example those of a temperature sensor denoted by reference character 19, can be transferred. For this purpose, in particular tank valve 4 has plug connector 18 as the only electrical connection, so that the wiring of storage device 2 can be correspondingly designed in a simple and efficient manner.

Next to temperature sensor 19 and in the region of first base body section 5.1, a slightly bent pipe section 21 installed on this first base body section in the direction of the interior of pressure gas tank 3 can moreover be seen. For this purpose, the design of the pipe section is selected so that the pipe section distributes the inflowing gas when refueling pressure gas tank 3, if at all possible, in such a manner that a mixing of gases and, in so doing, a reliable measuring by temperature sensor 19 results. In this instance, an outlet opening 42 of bent pipe section 21 is ideally narrowed vis-à-vis the nominal diameter in the flow cross section to support a jet formation of the gas inflowing into pressure gas tank 3. In so doing, a better mixing of the gases with the residual gas located in the interior of the pressure gas tank results so that in total a more homogeneous temperature distribution is achieved. This benefits the reliable measuring of the temperature by temperature sensor 19.

In FIG. 2, it moreover can be seen that on first base body section 5.1 a component in total denoted by reference character 43, which subsequently is also referred to as assembly filter 43, is installed. This assembly filter includes a filter 20, and a pipe burst protection 22 and a nonreturn valve 26. For this purpose, pipe burst protection 22 and nonreturn valve 26 are some of the functional sub-groups which, in the exemplary embodiment of FIG. 2, are not integrated in first base body section 5.2, but are installed onto the same. The functionality of these two functional sub-groups, pipe burst protection 22 and nonreturn valve 26, is subsequently described in detail by its also—conceivable integrated construction.

In this instance, further functional sub-groups also can be configured in an integrated manner in the interior of first base body section 5.1.

For this purpose, the functional sub-groups, which are, after installation of tank valve 4 in the interior of pressure gas tank 3, disposed in a correspondingly protected way, include at least pipe burst protection 22 and a nonreturn valve 23 in a refueling line 24, which runs into pipe section 21. Furthermore, a further nonreturn valve 26 can be disposed in the extraction path featuring pipe burst protection 22, which ensures that in the case of refueling, the gas inflows via refueling line 24 and pipe section 21 into pressure gas tank 3, and that, in the case of an extraction of gas via pilot valve 9, the flow takes place through filter 20 and extraction line 25. Via nonreturn valve 26, when pilot valve 9 is deactivated, it is thus selected whether the flow of the gas occurs through refueling line 24 or through extraction line 25. Thus, nonreturn valve 26 could also be referenced as selection valve for the flow path.

As already mentioned, nonreturn valve 26, pipe burst protection 22 and filter 20 can be integrated as an assembly filter and be installed in the direction of the interior of pressure gas tank 3 at first base body section 5.1. In the flow direction of the gas when extracting, valve devices 22, 26 are positioned in front of filter 20 so that possibly in the area of valve devices 22, 26 rubbed-off particles of filter 20 are retained and cannot get into the area of pilot valve 9.

Figure 5:
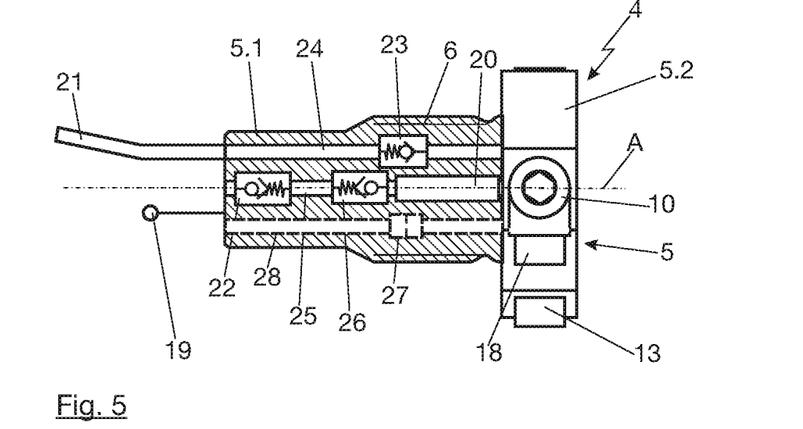
FIG. 5 shows a schematic sectional view through the area of a tank valve according to the present invention, which in the installed state projects into the pressure gas tank.

Alternatively, these components can also be configured in an integrated manner in first base body section 5.1, as it is partially indicated in the illustration of FIG. 5.

In the illustration in FIG. 5, furthermore visible is a dashed optional functional sub-group in the form of a rigid cover 27 in an indicated line segment 28 leading to a thermally actuated safety valve 13. In this instance, line segment 28 is connected without further valve devices at one end of first base body section 5.1 to the interior of pressure gas tank 3. At its other end, the line segment is in connection with thermally actuated safety valve 13 so that, in the case of malfunctioning of a further valve device, it is ensured by all means that when the thermally actuated safety valve responds, the gas will outflow from pressure gas tank 3 as desired.

Figure 6:
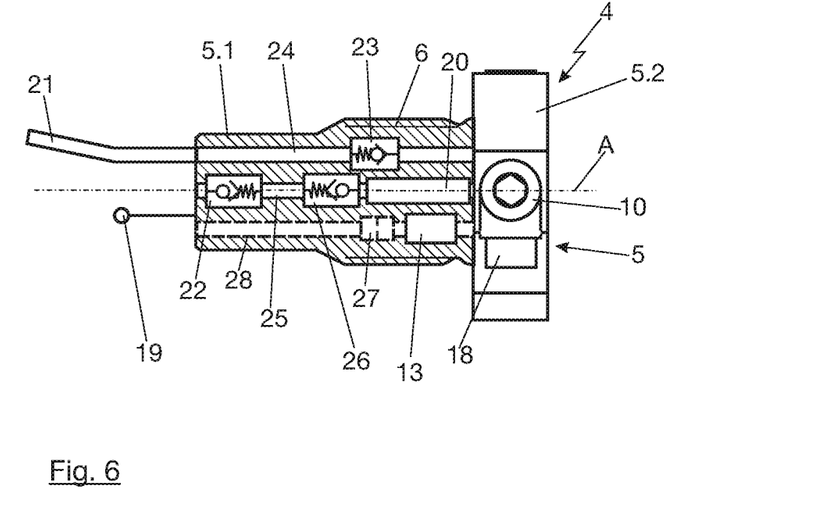
FIG. 6 shows a schematic sectional view through the area of a tank valve according to the present invention, which in the assembled state projects into the pressure gas tank, and according to an alternative embodiment of the present invention.

The alternative illustration in FIG. 6 shows that, in principle, safety valve 13 can also be disposed in first base body section 5.1 rather than in second base body section 5.2, for example, in the flow direction of the outflowing gas behind cover 27, as it is indicated in the illustration of FIG. 6, or also in the flow direction before cover 27, if this were advantageous with regard to the installation space within first base body section 5.1. As a functional group, safety valve 13 can thus be integrated in first base body section 5.1, as it is shown in the illustration in FIG. 6, but also be provided in second base body section 5.2, as it can be seen in the illustrations in FIGS. 2 and 5. In the following, the safety valve is, depending on the configuration of the respective Figure, therefore correspondingly mentioned in the two installation variants.

Functional sub-groups 13, 22, 23 and optionally 27, as well as supplementally functional sub-group 26, different from the example according to FIG. 2, are here disposed in first base body section 5.1 of tank valve 4. If individual pressure gas tanks 3 and their tank valves 4 in the event of damage to storage device 2 are negatively impacted, then in particular a shearing of tank valve 4 from pressure gas tank 3 can result. In this case, for example second base body section 5.2 would be completely or partially sheared off. Without damaging pressure gas tank 3 itself, typically first functional sub-group 5.1 would remain in the interior of receiving element 7 of the pressure gas tank, with which it is screw-connected. Functional sub-groups 13, 22, 23, 27, 26 there disposed are thus particularly well protected, which represents in particular for safety-relevant functional sub-groups 13, 22 and 23 a decisive safety advantage.

Figure 3:
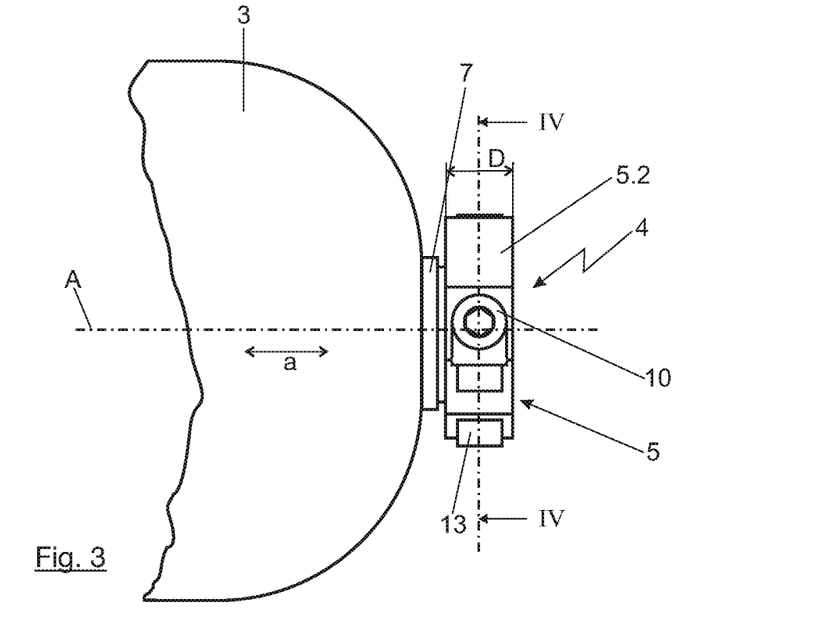
FIG. 3 shows a schematic illustration of a part of a pressure gas tank having an installed tank valve.
Figure 4:
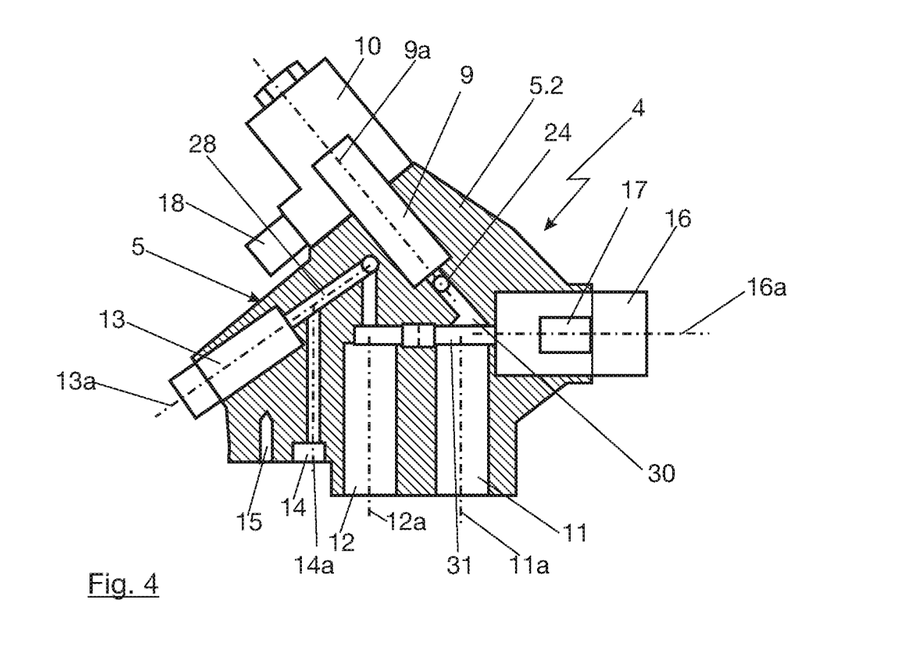
FIG. 4 shows a schematic sectional view according to line IV-IVI in FIG. 3.

Functional sub-groups 9, 11, 12, 13, 14, 16, 17 situated in second base body section 5.2 and electromagnetic coil 10 communicating with pilot valve 9 and acting together with the same in an aligned manner, into which a part of pilot valve 9 correspondingly projects, are, in relation to their in the illustration in FIG. 4 respectively indicated, primary axial alignment indicated by respective axes 9a, 11a, 12a, 13a, 14a, 16a, arranged in one single plane, namely sectional plane IV-IV shown in the illustration of FIG. 4, which also can be recognized from the illustration of FIG. 3. This positioning of functional sub-groups 9, 11, 12, 13, 14, 16, 17 located in second base body section 5.2 enables an extraordinarily compact arrangement of the entire assembly in axial direction a in relation to axis A, which is shown in FIGS. 3 and 5. Thickness D of second base body section 5.2, which is drawn into the illustration of FIG. 3, in particular, is less than 40 mm. In this instance, second base body section 5.2 by welding ideally is formed as a single piece together with first base body section 5.1 from an aluminum alloy. The functional sub-groups are then integrated into the base body. In the illustration of FIG. 2, this is carried out from above, thus from the side which is later located within pressure gas tank 3. The other elements correspondingly are installed in the plane illustrated in FIG. 4, for example, in that the individual functional sub-groups are screw-connected as pre-installed elements in second base body section 5.2. In this instance, the functional sub-groups typically are made from suitable materials suited for this purpose, such as, in particular, stainless steel and, in the area of the seal seat, optionally also plastic materials. The arrangement in one plane IV-IV already mentioned multiple times allows to realize the desired very compact construction.

Figure 7:
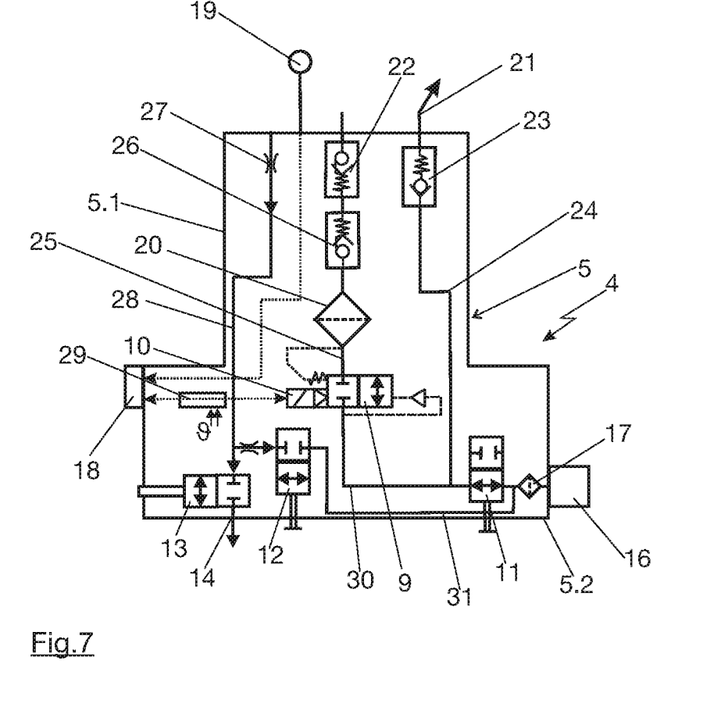
FIG. 7 shows in a pneumatic flow sheet a schematic view of the mode of operation of a tank valve according to the present invention including all its functional sub-groups.

The illustration in FIG. 7 in an implied manner again shows base body 5 of tank valve 4 including first base body section 5.1, which in the assembled state is located in the interior of the pressure gas tank, and second base body section 5.2, which typically remains outside of the pressure gas tank. In this instance, pilot valve 9, including its electromagnetic coil 10 and a thermoelectric safety device denoted by reference character 29, is at the core of tank valve 4. Manual shut-off valve 11, manual drain valve 12, thermally actuated safety valve 13, as well as gas connection 13 and filter 17 can be recognized as further functional sub-groups. Pipe burst protection 22, nonreturn valve 23 in refueling line 24 and nonreturn valve 26 in extraction line 25 are located in first base body section 5.1. As already mentioned above and as can be seen from the illustration of FIG. 2, nonreturn valve 26 and pipe burst protection 22 can, preferably together with filter 20, also be installed at first base body section 5.1 on the side facing the interior of pressure gas tank 3 as assembly filter 43.

Extraction line 25, which cannot be seen in the illustration of FIG. 4, but in principle would run from below into the area of pilot valve 9, is then in connection with gas connection 16 via the line segment denoted by reference character 30 in FIGS. 4 and 7. Located in between is manual shut-off valve 11, which, as can be seen in the illustration of FIG. 7, is normally open. In the illustration of FIG. 4, manual shut-off valve 11, for example, can correspondingly act along its axis 11a onto the cross sectional extension of line segment 30, for example, in that this cross sectional extension is formed as valve seat for a not-shown valve body of shut-off valve 11. Past manual shut-off valve 11, extraction line 25 and refueling line 24 moreover branch off. In the illustration of FIG. 7, pipe section 21, temperature sensor 19 and filter 20 for extraction line 25 can moreover be seen.

In the following, the individual functionalities are now to be explained on the basis of the example shown in FIG. 7.

When refueling pressure gas tank 3, gas flows via gas connection 16 and filter 17 through open manual shut-off valve 11. The pressure then touches in refueling line 24 and also at pilot valve 9 via line segment 30. Furthermore, the pressure touches at normally closed manual drain valve 12 via a line segment denoted by reference character 31. The normal path of the gas is now the one via refueling line 24 through nonreturn valve 23, which is opened by the pressure of the gas, and through pipe section 21 into the pressure gas tank. For pilot valve 9, a secure sealing is not to be ensured during an oncoming flow in the opposite direction, and not always to be ensured for a higher pressure difference. For this reason, nonreturn valve 26, which prevents that gas during refueling flows via extraction line 25 into pressure gas tank 3, is located in extraction line 25, which via pilot valve 9 is in connection with line segment 30. This would be particularly undesirable because, on the one hand, a very strong through flowing of pilot valve 9 against the planned flow direction could result in damaging elements of the pilot valve. Moreover, the gas via filter 20 would escape from tank valve 4 in an area, in which the gas would come into direct contact with temperature sensor 19. Temperature sensor 19, which delivers one of the most significant shut-off criteria when refueling pressure gas tank 3, would unnecessarily then be cooled down considerably so that refueling in the worst case would end too early.

In the reverse case, the extraction of gas occurs out in such a way that nonreturn valve 23, supported by the indicated spring, locks. The gas then flows into extraction line 25. The gas flows, via open pipe burst protection 22 open in the normal state and nonreturn valve 26 open in the case of extraction, to filter 20 and from there to pilot valve 9. The desired amount of gas is realized by a corresponding electric actuation of electromagnetic coil 10 and via electric plug connector 18. The desired extraction amount then flows again via line segment 30 and manual shut-off valve 11 open in the normal case to gas connector 16 and from there, for example, to a pressure regulator, and then into an internal combustion engine, a fuel cell system, a hot gas turbine or another useful application.

Via manual shut-off valve 11, as it is implied by the name, can manually shut-off tank valve 4. For this purpose, the manual shut-off valve is moved from its open normal position shown in FIG. 7 to the other position and thus correspondingly shuts off line segment 30 and, for this reason, the extraction path, as well as refueling line 24, in that it separates the refueling line from gas connection 16. For example, this can be put to good use within the framework of servicing, a fault or the like.

Via line segment 31, the manual extraction valve remains connected to gas connection 16. In the illustration of FIG. 7, the manual extraction line is shown in its normal closed position. At its other end, the manual extraction line is connected to line segment 28, which connects the interior of pressure gas tank 3 to thermally actuated safety valve 13—which as mentioned could also be disposed in first base body section 5.1—and which can have mentioned rigid cover 27. If pressure gas tank 3 is now to be emptied, the manual extraction valve can be moved from its closed position shown in FIG. 7 into the open position. The gas then outflows via line segment 28 and line segment 31 via gas connector 16.

A further conceivable scenario would be the triggering of thermally actuated safety valve 13. For example, if a glass ampoule having a slightly boiling liquid is destroyed in thermally actuated safety vale 13, then the thermally actuated safety valve, as it already has been described above, changes from its normally closed position shown in FIG. 7 into the other, open position. Via line segment 28, the gas then can flow to discharge connection 14. In this area, typically a further line segment, a so-called venting tube, is connected, which discharges the gas, in particular in automotive applications, into an uncritical area. In this regard, the mentioned German patent application of the applicant can be referenced.

What is claimed is:

1. A tank valve of a pressure gas tank, comprising:
   a base body, wherein the base body includes a first base body section which, in an installed state, projects into the pressure gas tank and is sealingly connected with the pressure gas tank and wherein the base body includes a second base body section which, in the installed state, remains outside of the pressure gas tank; and
   a plurality of functional sub-groups for refueling the pressure gas tank via a refueling path, for extraction of gas from the pressure gas tank via an extraction path, and for implementing safety and operating functions;
   wherein a first subset of the plurality of functional sub-groups is disposed in or on the first base body section;
   wherein a first functional sub-group of the first subset is a nonreturn valve in the refueling path;
   wherein a second functional sub-group of the first subset is a pipe burst protection in the extraction path.

2. The tank valve according to claim 1, wherein a third functional sub-group of the first subset is a rigid cover in a line segment leading to or from a safety valve.

3. The tank valve according to claim 2, wherein a fourth functional sub-group of the first subset is a thermally actuated safety valve.

4. The tank valve according to claim 1, wherein a second subset of the plurality of functional sub-groups is disposed in the second base body section and wherein all of the functional sub-groups of the second subset are disposed in relation to a respective primary axial alignment and a respective actuation direction within one plane in the second base body section.

5. The tank valve according to claim 4, wherein the one plane is disposed perpendicular to a central axis of the first base body section.

6. The tank valve according to claim 4, wherein the second subset includes:
   a pilot extraction valve which is magnetically actuatable;
   a manually actuatable shut-off valve;
   a manually actuatable drain valve;
   an inlet filter;
   a gas connection; and
   a discharge connection.

7. The tank valve according to claim 1, wherein the base body is an aluminum alloy.

8. The tank valve according to claim 1, wherein the base body is formed by forging.

9. A use of the tank valve according to claim 1 at the pressure gas tank for storing hydrogen or natural gas as fuel for a nominal pressure of more than 65 MPa in a vehicle.

* * * * *